US012623360B2

(12) United States Patent
Miyawaki et al.

(10) Patent No.: US 12,623,360 B2
(45) Date of Patent: May 12, 2026

(54) GRASPING DEVICE

(71) Applicant: MINEBEA MITSUMI Inc., Nagano (JP)

(72) Inventors: Shotaro Miyawaki, Tokyo (JP); Yukimasa Funasugi, Zama (JP); Chizumi Moteki, Fukuroi (JP); Shinichi Narita, Kakegawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 1000 days.

(21) Appl. No.: 17/757,180

(22) PCT Filed: Dec. 16, 2020

(86) PCT No.: PCT/JP2020/046920
§ 371 (c)(1),
(2) Date: Jun. 10, 2022

(87) PCT Pub. No.: WO2021/125216
PCT Pub. Date: Jun. 24, 2021

(65) Prior Publication Data
US 2023/0022586 A1 Jan. 26, 2023

(30) Foreign Application Priority Data
Dec. 17, 2019 (JP) ................................. 2019-227665

(51) Int. Cl.
*B25J 15/02* (2006.01)
(52) U.S. Cl.
CPC .................................... *B25J 15/02* (2013.01)
(58) Field of Classification Search
CPC ................................ B25J 15/02; B25J 15/028
See application file for complete search history.

(56) References Cited

U.S. PATENT DOCUMENTS

| | | | | |
|---|---|---|---|---|
| 5,328,224 A | * | 7/1994 | Jacobsen | .............. B25J 15/0009 |
| | | | | 294/104 |
| 7,422,411 B2 | * | 9/2008 | Downs | ................... B65G 47/90 |
| | | | | 414/730 |

(Continued)

FOREIGN PATENT DOCUMENTS

| | | |
|---|---|---|
| CN | 201596987 U | 10/2010 |
| CN | 201604099 U | 10/2010 |

(Continued)

OTHER PUBLICATIONS

JP2009226506A—Google Patents English Translation (Year: 2009).*

(Continued)

*Primary Examiner* — Stephen A Vu
(74) *Attorney, Agent, or Firm* — Chrisman Gallo Tochtrop LLC

(57) ABSTRACT

A grasping device of the embodiment includes claw holding parts, a cam, pins, a motor, and a rail holding part. The claw holding parts are supported by rails in a slidable manner. The cam includes grooves or curved holes having a spiral shape provided around the rotation center and a hole provided at the rotation center. The pins each have one end engaged with the claw holding parts side and the other end engaged with the grooves or the curved holes of the cam. The motor includes a shaft to be fixed to the hole of the cam. The rail holding part is configured to hold the rails and engage a positioning jig with an end portion of the shaft at the side fixed to the cam and including a hole part with an inner peripheral surface where the outer peripheral surface of the jig is contactable.

2 Claims, 15 Drawing Sheets

(56)　　　　　　　References Cited

U.S. PATENT DOCUMENTS

| | | | | |
|---|---|---|---|---|
| 9,004,560 | B2 * | 4/2015 | Umeno | .................... B66C 1/42 |
| | | | | 901/31 |
| 10,589,420 | B2 * | 3/2020 | Matsumoto | ......... B25J 15/0019 |
| 2016/0221196 | A1 | 8/2016 | Suzuki | |

FOREIGN PATENT DOCUMENTS

| | | | |
|---|---|---|---|
| CN | 201904694 | U | 7/2011 |
| CN | 102528426 | A | 7/2012 |
| JP | 2006-321570 | A | 11/2006 |
| JP | 2009-202321 | A | 9/2009 |
| JP | 2009-226506 | A | 10/2009 |
| JP | 2013-056717 | A | 3/2013 |
| JP | 2015-229205 | A | 12/2015 |
| JP | 2016-144863 | A | 8/2016 |

OTHER PUBLICATIONS

International Search Report for corresponding International Application No. PCT/JP2020/046920 mailed Mar. 2, 2021.
Written Opinion for corresponding International Application No. PCT/JP2020/046920 dated Mar. 2, 2021.
First Office Action dated May 31, 2024 for corresponding Chinese Application No. 202080086805.6 and English translation.
English translation of the Written Opinion for corresponding International Application No. PCT/JP2020/046920 dated Mar. 2, 2021.

* cited by examiner

GRASPING DEVICE

CROSS-REFERENCE TO RELATED APPLICATIONS

This application is a national stage entry of International Application No. PCT/JP2020/046920 filed on Dec. 16, 2020, which claims the benefit of priority to Japanese Application No. JP2019-227665, filed Dec. 17, 2019, the entire disclosures of which are hereby incorporated herein by reference.

TECHNICAL FIELD

The present invention relates to a grasping device.

BACKGROUND ART

In the related art, automation of production lines has been promoted to reduce production costs and stabilize quality, and automation using robots has been introduced to many production lines because of the versatility. A grasping device for grasping workpieces, such as parts, in such robots includes a grasping part including a plurality of claw parts and a driving part for driving the plurality of claw parts (see, for example, PTL 1, etc.).

A grasping device including a grasping part of a type with opposite two claw parts sliding to contact and separate from each other sometimes uses a cam provided with a groove or a curved hole having a spiral shape to slide the claw parts. With such a configuration, the rotation of the cam causes the pin engaged with the groove or the curved hole of the cam to move toward and away from the rotation axis, enabling the claw parts to slide.

CITATION LIST

Patent Literature

JP 2016-144863A

SUMMARY OF INVENTION

Technical Problem

In the above-described cam, however, the contact between the groove of the cam and the pin connected to the claw parts should be properly made, but it is difficult to perform accurate positioning during the assembling. When the positioning is not accurately performed, the efficiency of the slide movement may be decreased, or the cam may be worn.

In view of the above, an object of the present invention is to provide a grasping device capable of performing proper contact between the groove of the cam and the pin through accurate positioning and preventing decrease in efficiency of the slide movement and wear of the cam.

Solution to Problem

To solve the above-described problems and achieve the object, a grasping device according to an aspect includes claw holding parts, a cam, pins, a motor, and a rail holding part. The claw holding parts are supported by rails in a slidable manner. The cam includes grooves or curved holes having a spiral shape provided around the rotation center and a hole provided at the rotation center. The pins each have one end engaged with the claw holding parts side and the other end engaged with the grooves or the curved holes of the cam. The motor includes a shaft to be fixed to the hole of the cam. The rail holding part configured to hold the rails and engage a positioning jig with an end portion of the shaft at the side fixed to the cam and including a hole part with an inner peripheral surface where the outer peripheral surface of the jig is contactable.

The grasping device according to an aspect of the present invention can provide a grasping device capable of performing proper contact between the grooves of the cam and the pins through accurate positioning and preventing decrease in efficiency of the slide movement and wear of the cam.

DESCRIPTION OF EMBODIMENTS

Figure 1:
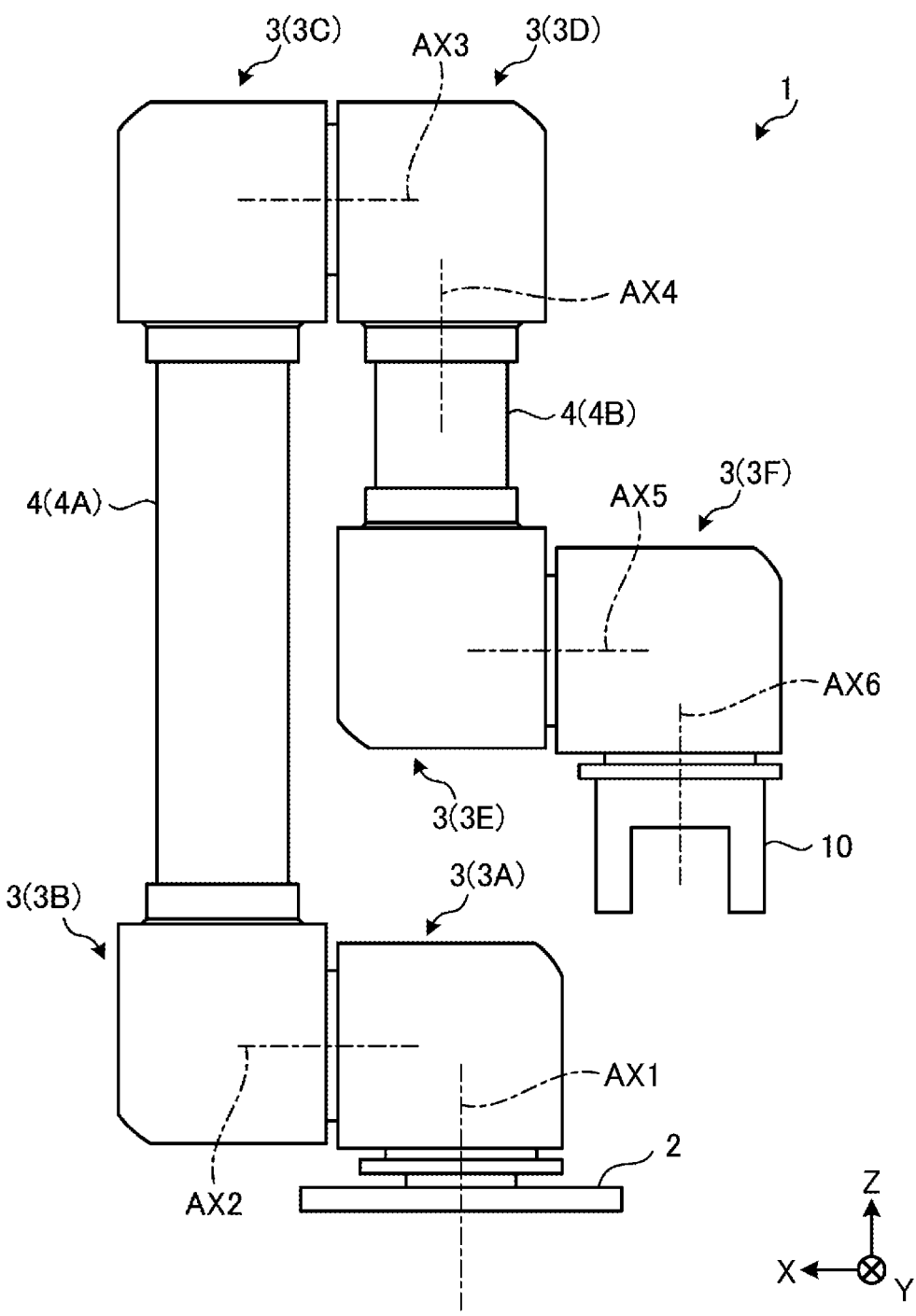
FIG. 1 is an explanatory diagram of a robot according to an embodiment.

A grasping device according to the embodiment is described with reference to the accompanying drawings. Note that the present invention is not limited to the embodiment described above. Further, the dimensional relationships between elements, proportions of the elements, and the like in the drawings may differ from reality. Among the drawings, parts having mutually different dimensional relationships and proportions may be included. Furthermore, the contents described in one embodiment or modification example are applied in principle to other embodiments or modification examples.

Overview of Robot

First, an overview of a robot 1 where a grasping device 10 according to the embodiment is attached is described with reference to FIG. 1. FIG. 1 is an explanatory diagram of the robot 1 according to the embodiment. The robot 1 is an example of a moving mechanism for moving the grasping device 10 to a desired position. Note that the moving mechanism for moving the grasping device 10 to a desired position is not limited to a robot and may be, for example a linear actuator.

The robot 1 is a so-called articulated robot including a plurality of joint parts (also referred to as robot modules) 3 and is installed at product assembly lines or manufacture lines, for example. Note that for convenience of description, FIG. 1 illustrates a three-dimensional orthogonal coordinate system including a Z axis having a vertical upward direction as a positive direction. Such an orthogonal coordinate system may be illustrated in other drawings.

The robot 1 includes a base part 2, a plurality of joint parts 3, a plurality of arm parts 4, and the grasping device 10. Note that FIG. 1 illustrates an example of the robot 1 including six joint parts 3 and two arm parts 4.

The six joint parts 3 are disposed in the order of a first joint part 3A, a second joint part 3B, a third joint part 3C, a fourth joint part 3D, a fifth joint part 3E, and a sixth joint part 3F between the base part 2 at the upstream side of the power transfer in the robot 1 and the grasping device 10 at the downstream side. In addition, of the two arm parts 4, a first arm part 4A is disposed at the upstream side of the power transfer in the robot 1 and a second arm part 4B is disposed at the downstream side.

The base part 2 totally supports the robot 1 by supporting the first joint part 3A. The first joint part 3A of the six joint parts 3 rotates around an axis AX1 as a virtual axis with respect to the base part 2. The first joint part 3A rotates (also referred to as turns) in the X-Y plane. The second joint part 3B is coupled with the first joint part 3A and rotates around an axis AX2 with respect to the first joint part 3A.

In addition, the second joint part 3B is coupled with one end portion of the first arm part 4A. The third joint part 3C is coupled with the other end portion of the first arm part 4A. The fourth joint part 3D is coupled with the third joint part 3C and rotates around an axis AX3 as a virtual axis with respect to the third joint part 3C. In addition, the fourth joint part 3D is coupled with one end portion of the second arm part 4B and rotates around axis AX4 as a virtual axis with respect to the second arm part 4B.

The fifth joint part 3E is coupled with the other end portion of the second arm part 4B. The sixth joint part 3F is coupled with the fifth joint part 3E and rotates around an axis AX5 as a virtual axis with respect to the fifth joint part 3E. The grasping device 10 is coupled with the sixth joint part 3F. The grasping device 10 rotates around an axis AX6.

The grasping device 10 is attached to the sixth joint part 3F located at a leading end portion of the robot 1 and grasps workpieces, such as parts. A configuration of the grasping device 10 will be described later.

Note that the rotation configuration of the robot 1 with the six joint parts 3 is not limited to the above-mentioned configuration. The robot 1 may be rotatable between the second joint part 3B and the first arm part 4A or between the fourth joint part 3D and the second arm part 4B, for example.

In addition, the six joint parts 3 each include a rotation actuator not illustrated in the drawing. The robot 1 can perform multi-axis operation with such a rotation actuator.

Configuration of Grasping Device

Figure 2:
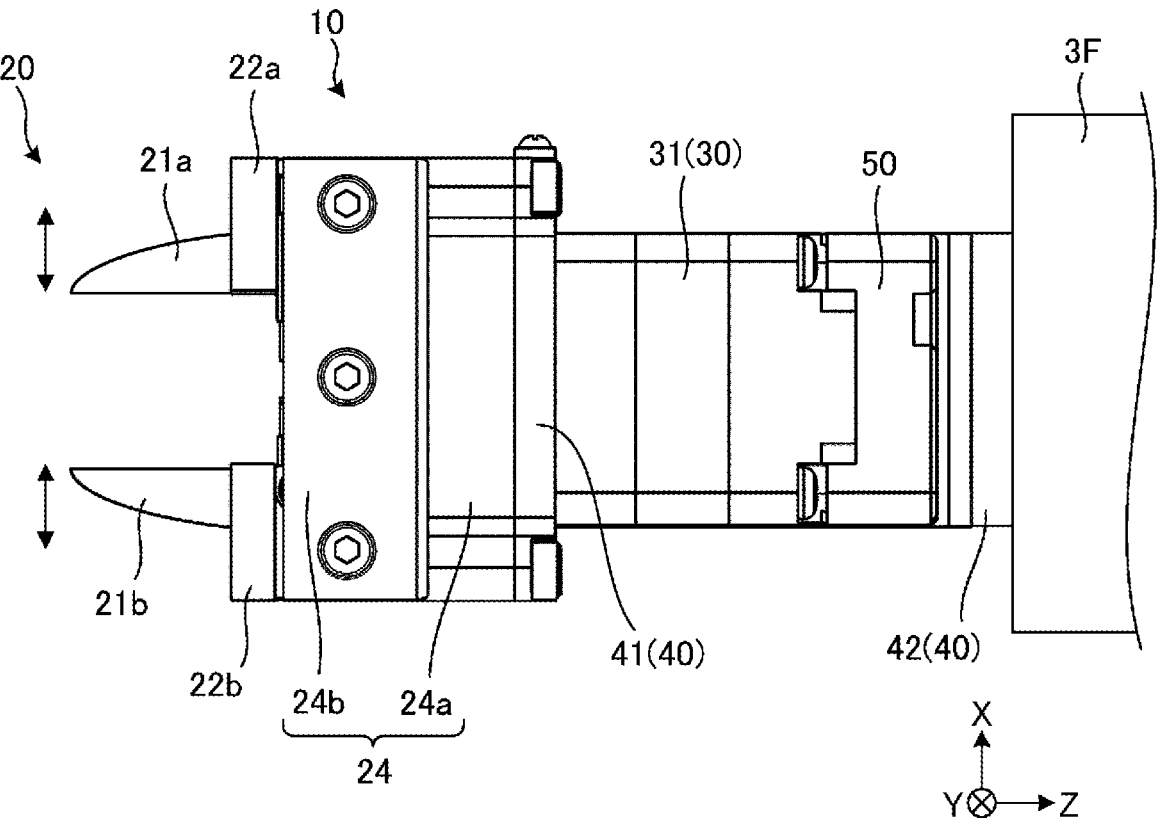
FIG. 2 is a front view illustrating a configuration of a grasping device according to the embodiment.
Figure 3:
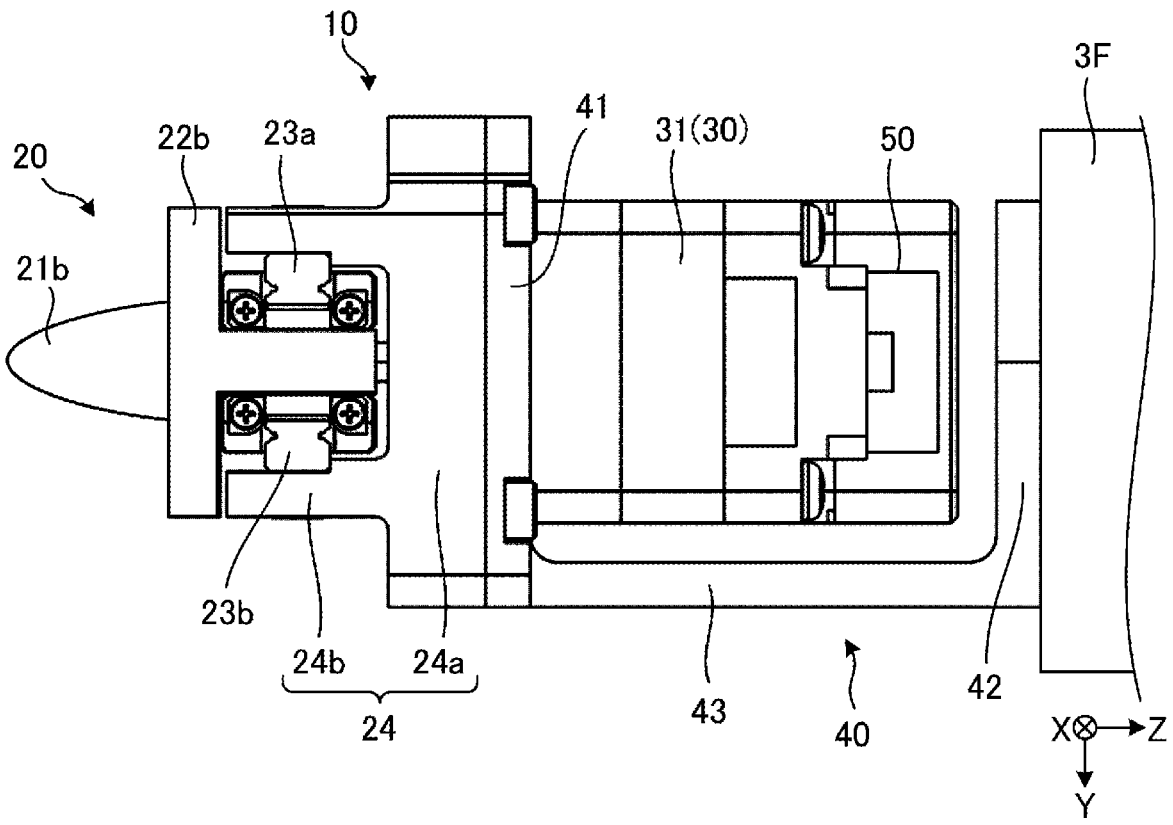
FIG. 3 is a side view illustrating the configuration of the grasping device according to the embodiment.
Figure 4:
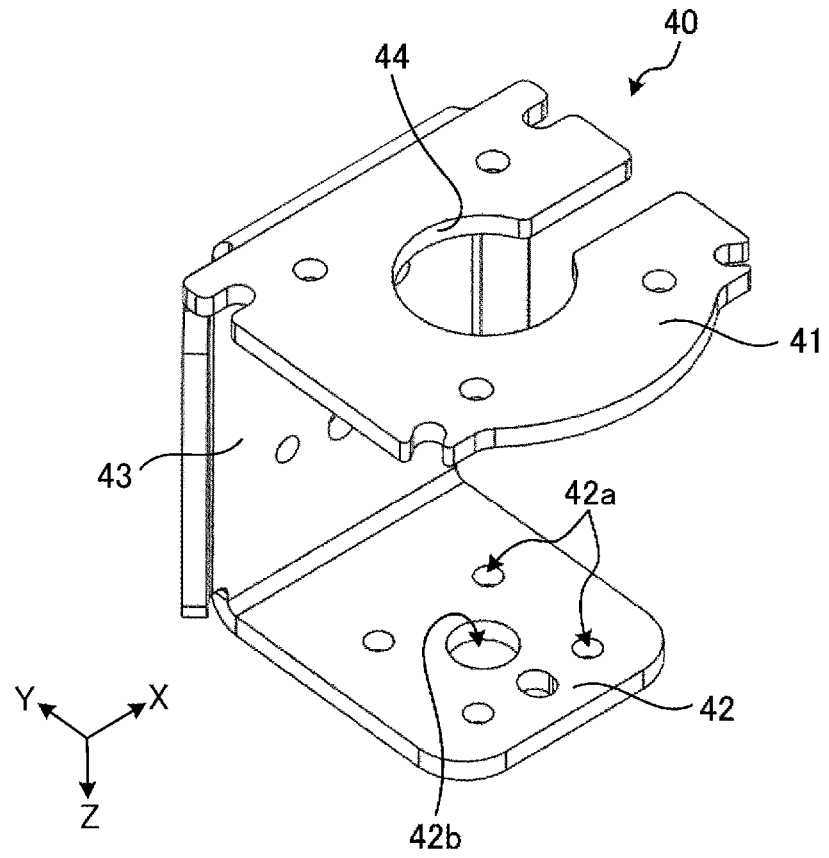
FIG. 4 is a perspective view illustrating a configuration of a fixing part according to the embodiment.

Next, a configuration of the grasping device 10 according to the embodiment is described with reference to FIG. 2 to FIG. 4. FIG. 2 is a front view illustrating a configuration of the grasping device 10 according to the embodiment, and FIG. 3 is a side view illustrating the configuration of the grasping device 10 according to the embodiment. FIG. 4 is a perspective view illustrating a configuration of a fixing part 40 according to the embodiment.

As illustrated in FIG. 2 and FIG. 3, the grasping device 10 includes a grasping part 20, a driving part 30, the fixing part 40, and an encoder 50. The grasping part 20 grasps workpieces, such as parts. The grasping part 20 includes claw parts 21a and 21b, claw holding parts 22a and 22b, rails 23a and 23b, and a rail holding part 24.

The claw parts 21a and 21b are movable in respective predetermined direction and grasp such a workpiece by sandwiching the workpiece. Note that FIG. 2 and FIG. 3 illustrate the shapes of the claw parts 21a and 21b with a leading end portion gradually tapered, but the shapes of the claw parts 21a and 21b are not limited to such shapes and may be appropriately changed in accordance with the types of workpieces to be grasped.

The claw holding part 22a holds the claw part 21a, and the claw holding part 22b holds the claw part 21b. The claw holding parts 22a and 22b are movable in predetermined direction together with the claw parts 21a and 21b, respectively. The rails 23a and 23b extend in respective predetermined directions. For example, the rail 23a and the rail 23b extend in substantially parallel to each other.

The rail holding part 24 includes a base part 24a having a flat plate shape, and a pair of wall parts 24b extending from the base part 24a to a substantially perpendicular direction. The rails 23a and 23b are held by the pair of respective wall parts 24b. Note that a specific configuration of the grasping part 20 will be described later.

The driving part 30 drives the claw parts 21a and 21b. The driving part 30 includes a motor 31 and a shaft 32 (see FIG. 5). The motor 31 generates a driving force for driving the claw parts 21a and 21b. The shaft 32 transmits the driving force generated at the motor 31 to the grasping part 20.

Note that any type of the motor 31 is used in the embodiment, and hybrid stepper motors, DC motors and the like may be used. In addition, details of the driving mechanism of the claw parts 21a and 21b by the driving part 30 will be described later.

The fixing part 40 fixes the grasping part 20 and the driving part 30 described above to the sixth joint part 3F of the robot 1. As illustrated in FIG. 4, the fixing part 40 has a substantial U-shape, and includes a supporting part 41, a coupling part 42 and a beam part 43. The fixing part 40 can be manufactured, for example, by bending sheet metal or by machining a metal block.

The supporting part 41 has a substantially flat plate shape and supports the grasping part 20 and the driving part 30 between the grasping part 20 and the driving part 30. For example, the supporting part 41 supports the rail holding part 24 of the grasping part 20 on one surface side (in FIG. 2 and FIG. 3, the negative direction side in the Z axis), and supports the driving part 30 on the other surface side (in FIG. 2 and FIG. 3, the positive direction side in the Z axis). The supporting part 41 is provided with an opening 44 where an annular protrusion part 38 (FIG. 5) provided to surround the shaft 32 is fit at one end surface of the driving part 30 in the axis direction.

The coupling part 42 has a substantially flat plate shape and is coupled with the sixth joint part 3F of the robot 1. For example, as illustrated in FIG. 4, a screw hole 42a is formed at a predetermined position of the coupling part 42, and the coupling part 42 can be coupled to the sixth joint part 3F through threaded engagement using the screw hole 42a with a screw, a bolt, or the like. The coupling part 42 is provided at a substantially parallel position facing the supporting part 41, for example.

Note that a hole 42b is provided at a substantial center of the coupling part 42. The hole 42b is a through hole where a pressing rod 92 of a jig is inserted when a cam 27 is fixed (press-fitted) to the shaft 32 of the driving part 30 described later. The cam 27 is for causing the claw parts 21a and 21b to slide. Note that a hole is also provided at the bottom portion (bottom portion of a motor case 33) of the driving part 30 fixed to the coupling part 42 at a position corresponding to the hole 42b, allowing the shaft of the jig to press the shaft 32 of the driving part 30 from the outside through the coupling part 42 of the fixing part 40 and the bottom portion (the bottom portion of the motor case 33) of the driving part 30.

The beam part 43 has a substantially flat plate shape and connects the supporting part 41 and the coupling part 42. The beam part 43 is substantially perpendicular to the supporting part 41 and the coupling part 42, for example.

As described above, in the grasping device 10 of the embodiment, the grasping part 20 is fixed to the robot 1 through the fixing part 40. That is, in the embodiment, the grasping part 20 is fixed to the robot 1 without the driving part 30 interposed.

The encoder 50 detects the rotation position of the motor 31. The encoder 50 is provided at the motor 31 side from the supporting part 41 of the fixing part 40. For example, the encoder 50 is provided at the side opposite to the supporting part 41 with respect to the motor 31. Note that any type of the encoder 50 is used in the embodiment, and optical encoders, magnetic encoders and the like may be used. The distance or the speed of the claw parts 21a and 21b can be accurately controlled based on the information of the encoder 50. Note that in the case where it is unnecessary to accurately control the distance or the speed of the claw parts 21a and 21b, the encoder 50 may be omitted.

Driving Mechanism of Grasping Device

Figure 5:
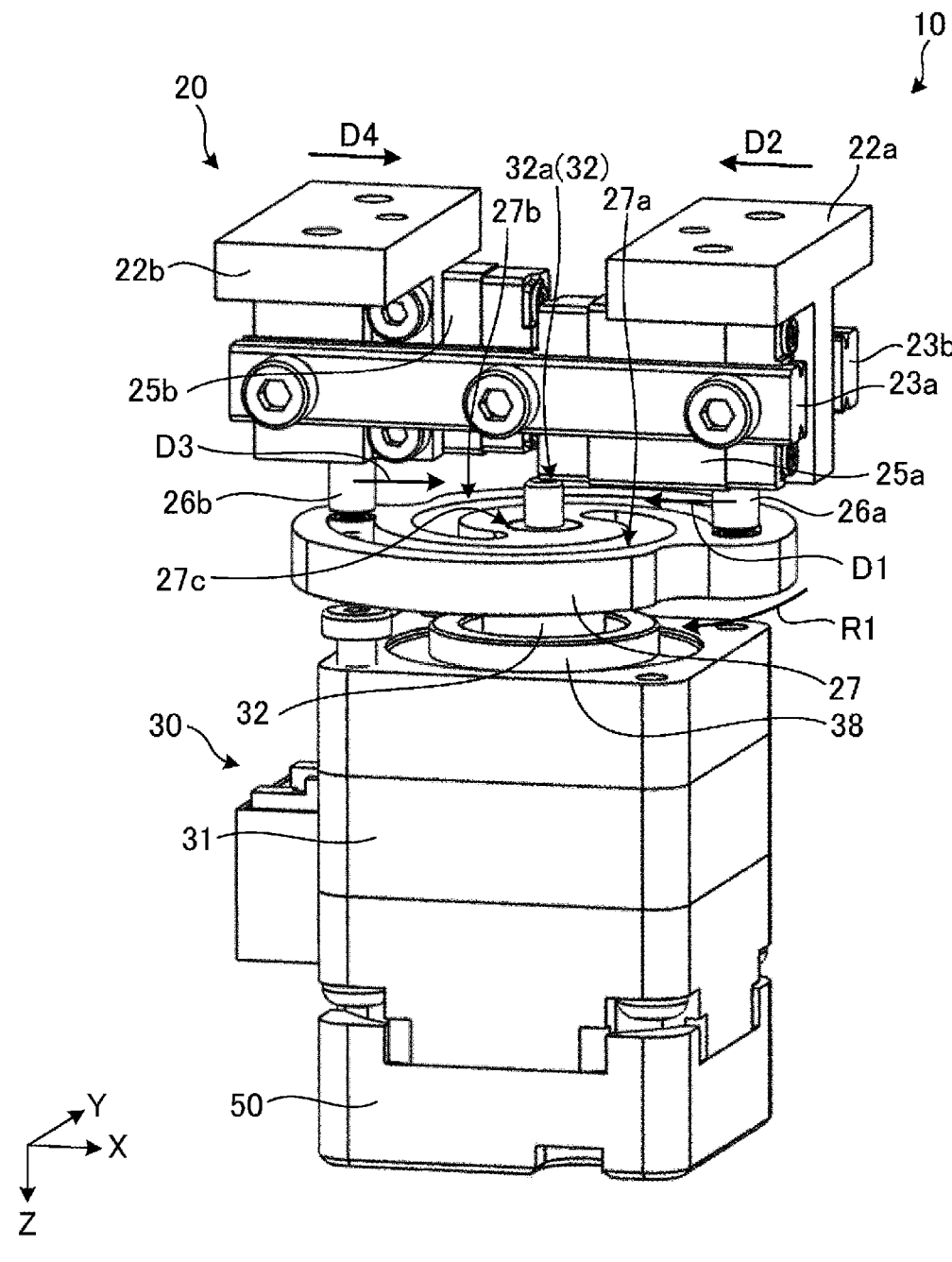
FIG. 5 is a diagram (1) for describing a driving mechanism of the grasping device according to the embodiment.
Figure 6:
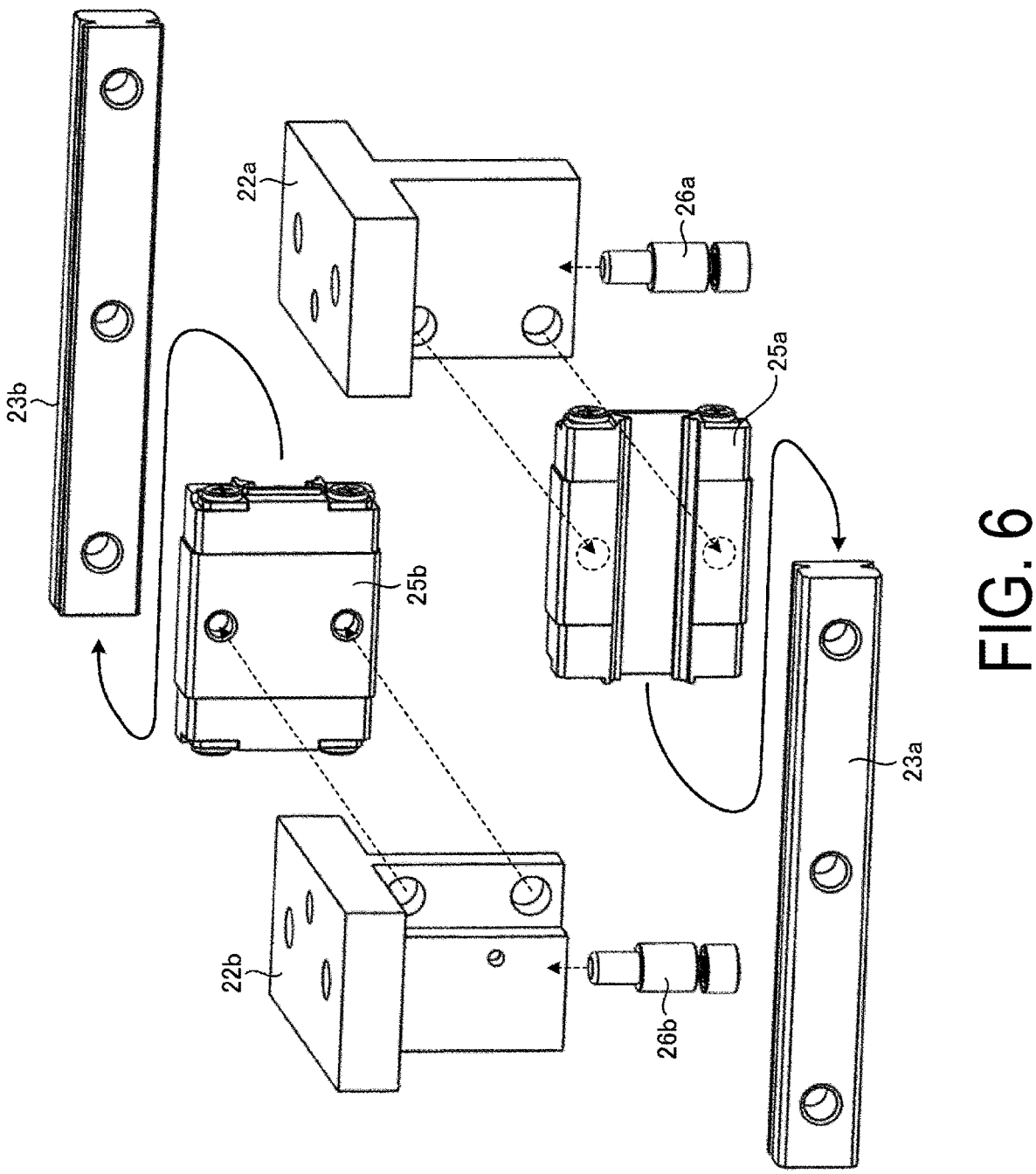
FIG. 6 is an exploded view of a main part of a grasping part.
Figure 7:
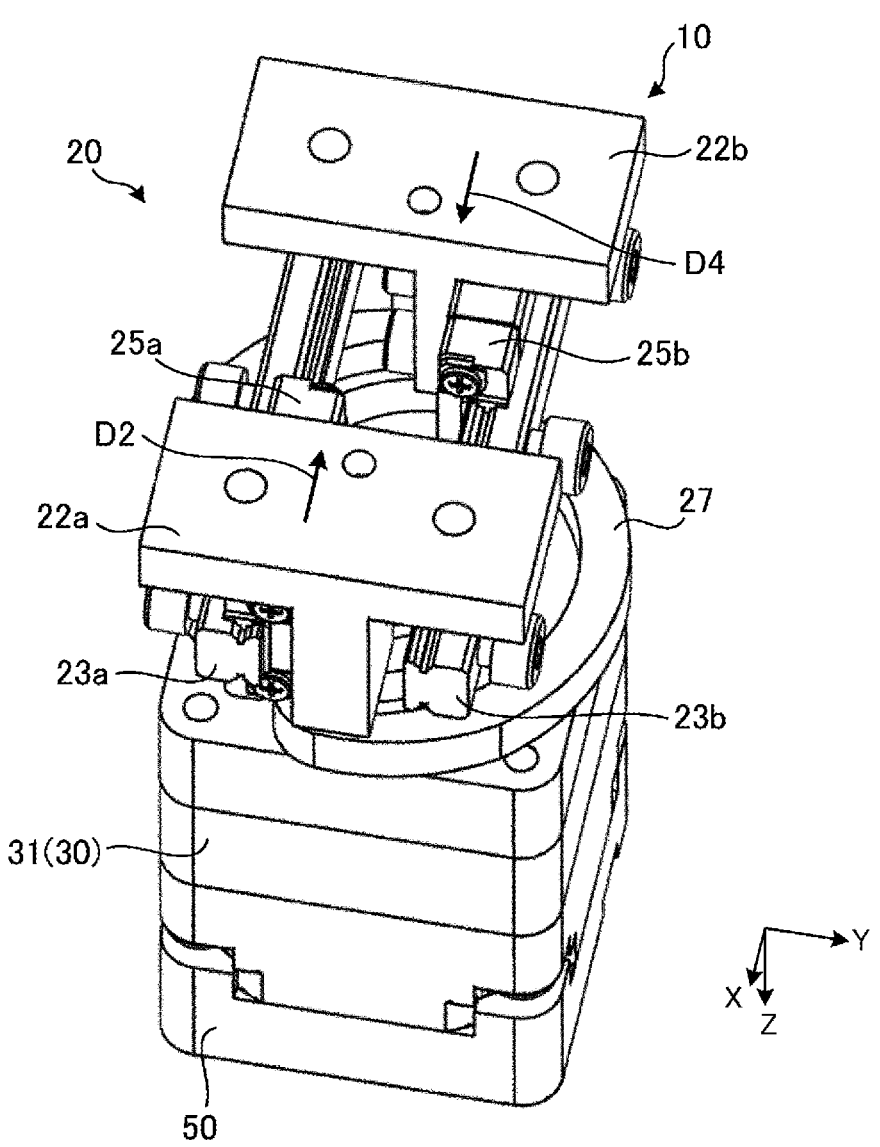
FIG. 7 is a diagram (2) for describing the driving mechanism of the grasping device according to the embodiment.
Figure 8:
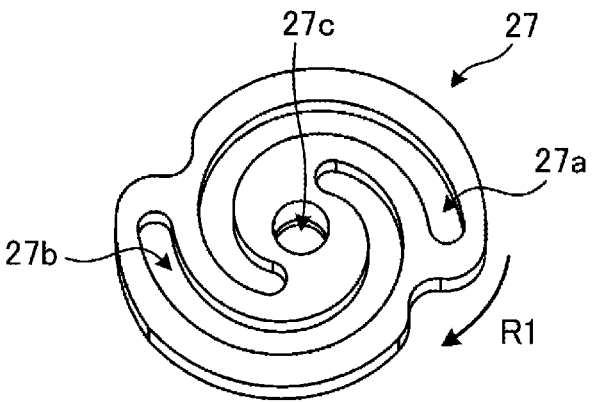
FIG. 8 is a perspective view illustrating a configuration of a cam according to the embodiment.

Next, details of the driving mechanism of the grasping device 10 are described with reference to FIG. 5 to FIG. 8. FIG. 5 and FIG. 7 are diagrams for describing the driving mechanism of the grasping device 10 according to the embodiment. FIG. 6 is an exploded view of a main part of the grasping part 20. FIG. 8 is a perspective view illustrating a configuration of the cam 27 according to the embodiment. Note that FIG. 5 and FIG. 7 omit the illustration of the claw parts 21a and 21b, the rail holding part 24, the fixing part 40 for easy understanding. FIG. 6 omits the illustration of the parts other than the claw holding parts 22a and 22b, the rails 23a and 23b, slide movement parts 25a and 25b, and pins 26a and 26b.

As illustrated in FIG. 5 to FIG. 7, the slide movement part 25a is slidable being guided by the rail 23a, and the slide movement part 25b is slidable being guided by the rail 23b. That is, the slide movement part 25a slides along the extending direction of the rail 23a, and the slide movement part 25b slides along the extending direction of the rail 23b.

In addition, the claw holding part 22a is fixed to the slide movement part 25a, and the claw holding part 22b is fixed to the slide movement part 25b. In addition, as illustrated in FIG. 5, the pin 26a is fixed to the claw holding part 22a, and the pin 26b is fixed to the claw holding part 22b. Note that bearings are provided at the leading ends of the pins 26a and 26b. Thus, the claw holding part 22a and the pin 26a slide in unison with the slide movement part 25a, and the claw holding part 22b and the pin 26b slide in unison with the slide movement part 25b.

The cam 27 transmits the driving force from the motor 31 to the pins 26a and 26b. As illustrated in FIG. 8, the cam 27 has a substantially circular plate shape and includes spiral grooves 27a and 27b and a circular hole 27c. The grooves 27a and 27b are formed to spiral gradually away from (or approaching) the center of the rotation of the cam 27. The circular hole 27c is formed at the rotation center the cam 27 and is a fitting part with the shaft 32 of the motor 31. Note that the grooves 27a and 27b are a spiral recess part with a bottom provided at one surface as an advantage to maintain the strength of the cam 27, but a curved hole in the form of a bottomless through hole may be provided if accepted in terms of strength.

Then, as illustrated in FIG. 5, the pin 26a is slidably inserted to the groove 27a of the cam 27, and the pin 26b is slidably inserted to the groove 27b. In addition, the shaft 32 extending from the motor 31 is inserted to the circular hole 27c, and the cam 27 is fixed to the shaft 32.

The shaft 32 rotates with the driving force generated by the motor 31. Thus, the cam 27 rotates with the driving force of the motor 31 through the shaft 32.

Here, when the cam 27 is rotated in a predetermined rotational direction R1 with the motor 31, a force in the direction toward the center of the cam 27 is applied to the pins 26a and 26b guided by the spiral grooves 27a and 27b.

Here, the pin 26a is slidable along the rail 23a in unison with the slide movement part 25a. In this manner, the pin 26a moves in a predetermined direction D1. The direction D1 is the direction toward the center of the cam 27 and the extending direction of the rail 23a.

Further, the pin 26a is fixed to the claw holding part 22a, and therefore the claw holding part 22a and the claw part 21a not illustrated in the drawing move in a direction D2 having the same direction as the above-described direction D1.

Likewise, the pin 26b is slidable along the rail 23b in unison with the slide movement part 25b. In this manner, the pin 26b moves in a predetermined direction D3. The direction D3 is the direction toward the center of the cam 27 and the extending direction of the rail 23b.

Further, the pin 26b is fixed to the claw holding part 22b, and therefore the claw holding part 22b and the claw part 21b not illustrated in the drawing move in a direction D4. The direction D4 is the same direction as the above-described direction D3.

The rail 23a and the rail 23b are disposed substantially parallel with each other, and thus the driving part 30 can move the claw parts 21a and 21b in the directions D2 and D4 as the directions close each other by rotating the cam 27 in the rotational direction R1. Conversely, the driving part 30 can move the claw parts 21a and 21b in the directions away from each other by rotating the cam 27 in the direction opposite to the rotational direction R1.

With the mechanism described above, in the embodiment, workpieces can be grasped with the claw parts 21a and 21b by appropriately controlling the distance of the claw parts 21a and 21b by rotating the motor 31.

In addition, in the embodiment, the motor 31 is provided between the supporting part 41 and the encoder 50. In this manner, when a stress is applied to the grasping part 20 from the workpiece, the stress is absorbed by the fixing part 40 through the supporting part 41, and thus the vibration of the encoder 50 due to such a stress can be suppressed. As a result, the detection accuracy of the encoder 50 can be improved.

Production of Cam

Figure 9:
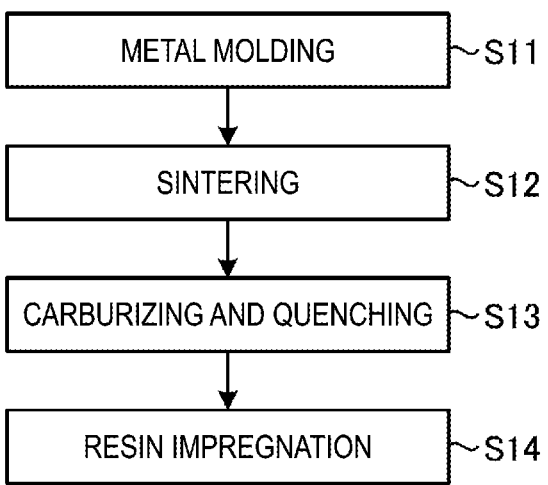
FIG. 9 is a flowchart illustrating a production step for the cam.

FIG. 9 is a flowchart illustrating a production step for the cam 27. In FIG. 9, first, the cam 27 before sintering is produced through metal molding using a sintered material for metal molding (step S11). An iron sintered material is used as the sintered material for metal molding, for example. With the iron sintered material, the cam 27 with a high strength can be obtained. Since the external shape is shrank through sintering at the next step, the metal mold for molding the cam 27 before sintering is designed in consideration of the amount of the shrinkage.

Next, the cam 27 before sintering is subjected to sintering (step S12). The cam 27 is cured through the sintering. The cam 27 before sintering is molded in a uniform size through the metal molding, and the amount of the shrinkage in the sintering is accurately managed. Thus, in comparison with the case of one-by-one production through machining such as cutting and wire cutting, the production is performed in a low-cost manner, and the variation in dimensions can be small (ensuring the dimensional accuracy).

Next, the cam 27 after sintering is subjected to carburizing and quenching (step S13). In the carburizing and quenching, carbon is added to the surface of the cam 27 through gas carburizing and the like, followed by hardening and tempering, and the carbon permeates the surface. Through the carburizing and quenching, a carburizing layer is formed at the surface of the cam 27, and thus the hardness of the surface can be increased. That is, the grooves 27a and 27b of the cam 27 are portions where the bearings provided at the pins 26a and 26b slide, and the resistance to wearing can be increased when provided with a hardness equal to or greater than the hardness of the bearing.

Next, the cam 27 is subjected to resin impregnation (step S14). In the resin impregnation, for example, immersion in liquid of acrylic thermosetting resin as a sintering sealing material is performed, and solidification is performed through heating or the like after the resin is impregnated. In the cam 27 after sintering, multiple micro porous portions (holes) are formed in the surface, and the porous portions of the surface are filled with the resin material through the resin impregnation. In the state where the cam 27 is incorporated in the grasping device 10, grease is applied for lubrication for the slide movement of the pins 26a and 26b. In the case where the resin impregnation is not performed, the grease may be degraded and operations may be interfered due to the base oil of the grease taken into the porous portions of the cam 27 through capillarity. However, the resin impregnation is performed in advance, suppressing the intake of the base oil and enabling the degradation of the grease to be prevented.

Note that additional processing such as polishing for increasing the smoothness may be performed on the grooves 27a and 27b and the circular hole 27c of the cam 27.

Assembly of Grasping Device 10

Figure 10:
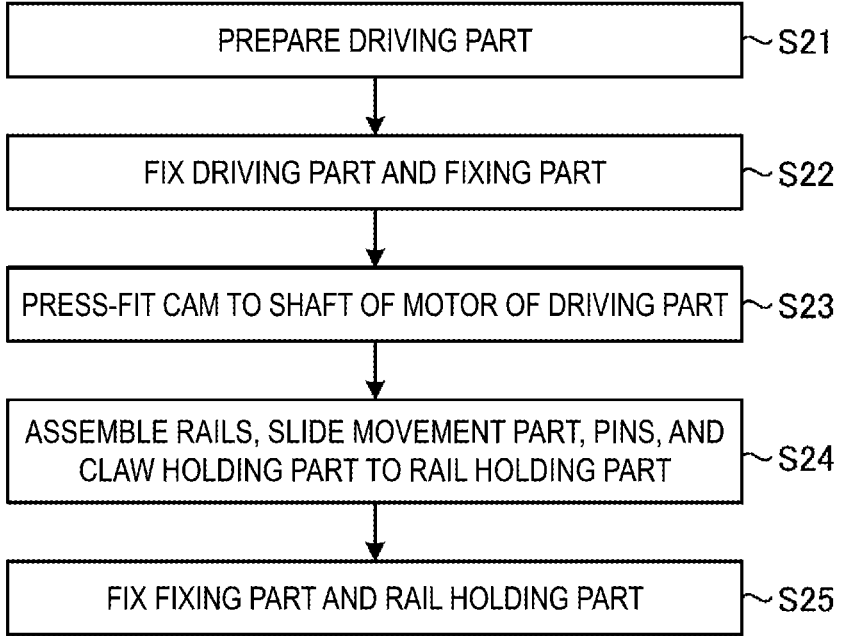
FIG. 10 is a flowchart illustrating an assembling step for the grasping device.
Figure 11:
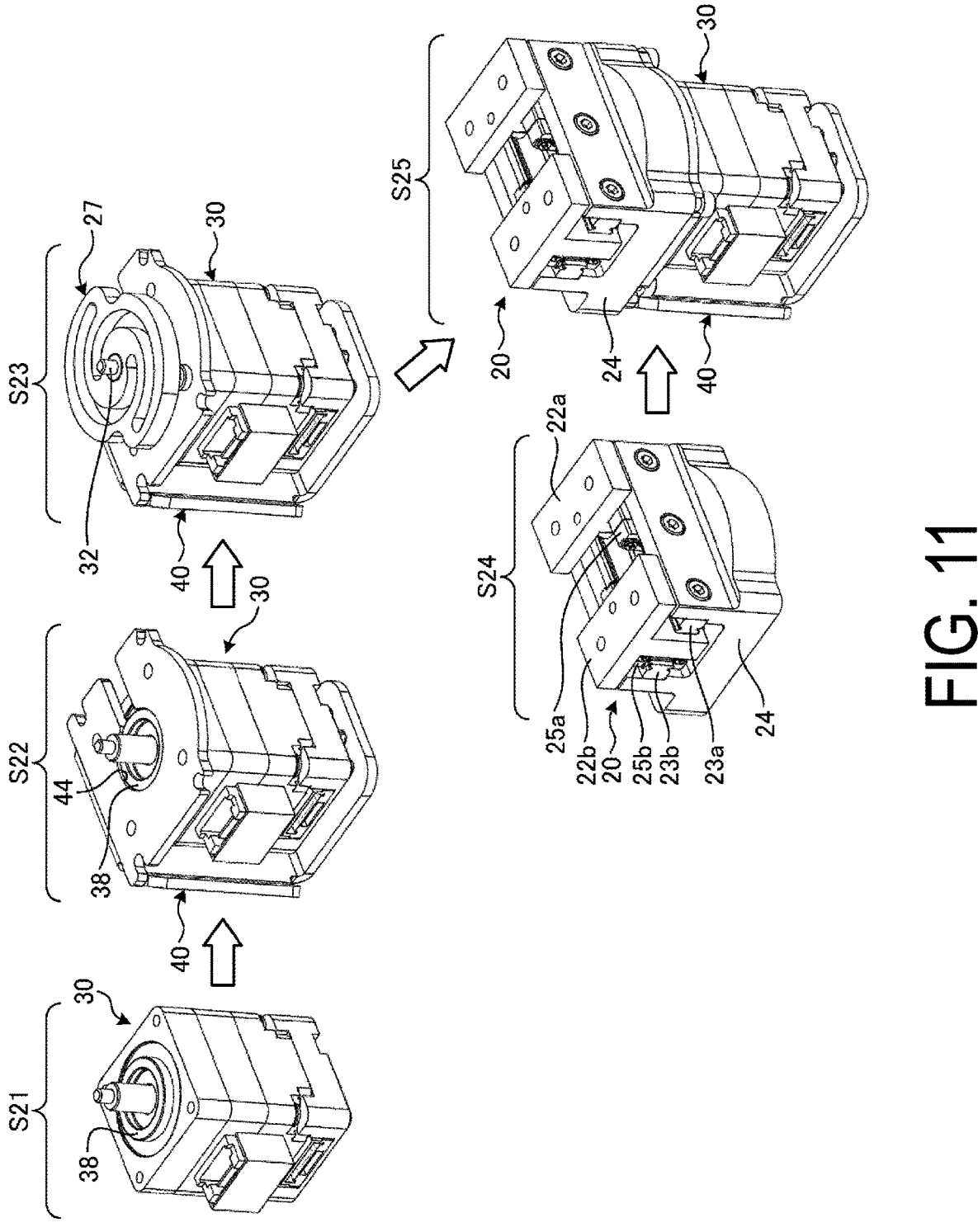
FIG. 11 is a perspective view illustrating a state in each assembling step for the grasping device.

FIG. 10 is a flowchart illustrating an assembling step for the grasping device 10, and FIG. 11 is a perspective view illustrating a state in each assembling step for the grasping device 10. In FIG. 10 and FIG. 11, first, the driving part 30 including the motor 31 is prepared (step S21). Next, the driving part 30 and the fixing part 40 are fixed (step S22). At this time, the opening 44 of the fixing part 40 and the annular protrusion part 38 of the motor 31 define the mutual position. Note that examples of the fixing of the driving part 30 and the fixing part 40 at the fixing part 40 include a method of screw fixing the through hole provided in the fixing part 40 and the screw hole provided in the motor case 33 of the motor 31.

Figure 12:
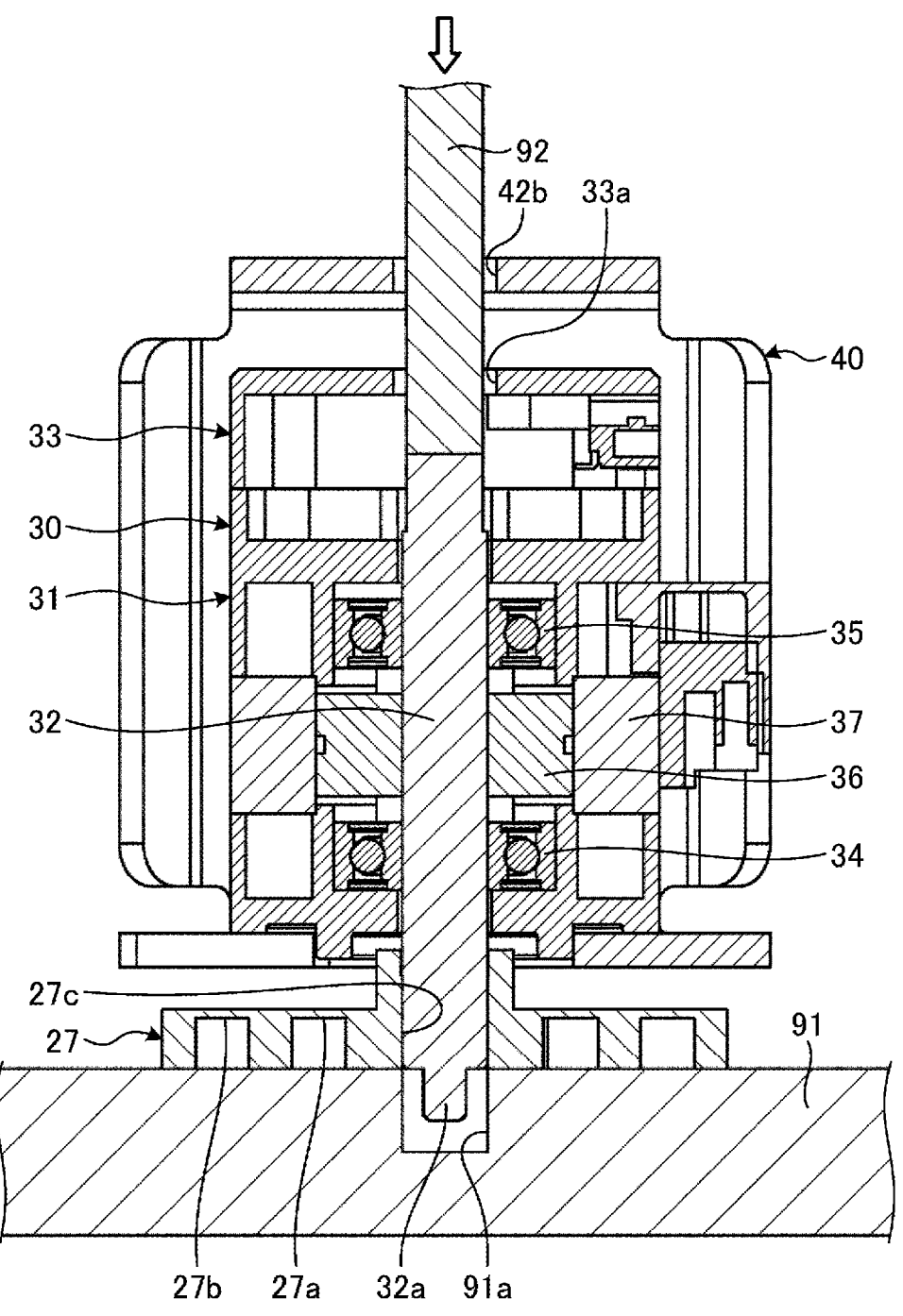
FIG. 12 is a longitudinal sectional view illustrating when the cam is fixed to a shaft of a motor of a driving part.

Next, the cam 27 is press-fitted to the shaft 32 of the motor 31 of the driving part 30 (step S23). FIG. 12 is a longitudinal sectional view illustrating a state of fixing the cam 27 to the shaft 32 of the motor 31 of the driving part 30, with the driving part 30 and the like disposed upside down with respect to FIG. 11 (with the cam 27 located on the lower side).

In FIG. 12, the shaft 32 of the motor 31 is rotatably supported by bearings 34 and 35. In addition, a rotor 36 is fixed to the shaft 32, and a stator 37 is fixed at a position at the motor case 33 side opposite to the outer peripheral surface of the rotor 36 in the axial direction.

On the other hand, a circular recess part 91a is provided at a flat mounting base 91 of the press-fitting jig, and, before fixing the cam 27 and the shaft 32 of the motor 31, the center of the cam 27 is aligned with the recess 91a of the mounting base 91, and the surface of the cam 27 where the grooves 27a and 27b are formed is placed in contact with the mounting base 91.

In this state, the driving part 30 and the fixing part 40 are moved over the cam 27, and the shaft 32 of the motor 31 is aligned over the circular hole 27c of the cam 27. Then, the pressing rod 92 of the press-fitting jig is inserted from the bottom portion side (in the drawing, the upper side) of the driving part 30 through the hole 42b of the fixing part 40 and hole 33a of the motor case 33, the end portion of the pressing rod 92 of the press-fitting jig makes contact with the end portion of the shaft 32 at the side opposite to the side fixed to the cam 27, a force is applied to the pressing rod 92 from the upper side in the drawing, and thus the shaft 32 is press-fitted into the circular hole 27c of the cam 27. A protruding part 32a of the shaft 32 protruded from the cam 27 is housed in the recess part 91a of the mounting base 91.

The shaft 32 of the motor 31 and the cam 27 are fixed through press-fitting and therefore are tightly fixed by solid to solid contact, and thus a defect of idling due to a bonding strength not strong enough to withstand a large load is almost eliminated unlike the fixing with adhesion. With the shaft 32 of the motor 31 and the cam 27 reliably fixed, the reliability in the grasping operation can be improved.

In addition, the fixing with adhesion does not require wiping off the adhesive agent leaked from the bonded portion, while the press-fitting fixing does not require such an operation, simplifying the operation. Further, when the shaft 32 is press-fitted to the cam 27, the force applied to the shaft 32 from the pressing rod 92 is directly received by the mounting base 91. Thus, inappropriate load is not applied to the motor 31, and the motor 31 is not damaged.

Returning to FIG. 10 and FIG. 11, separately from the driving part 30 side, the rails 23a and 23b, the slide movement parts 25a and 25b, the pins 26a and 26b (not visible in FIG. 11), and the claw holding parts 22a and 22b are assembled to the rail holding part 24 (step S24).

Next, the fixing part 40 and the driving part 30 where the cam 27 is press-fitted to the shaft 32 (step S23) and the rail holding part 24 where the rails 23a and 23b and the like are assembled (step S24) fixes the fixing part 40 and the rail holding part 24 (step S25). An example of the fixing of the fixing part 40 and the rail holding part 24 includes fixing, with a screw, the through hole provided in the fixing part 40 and the screw hole provided in the rail holding part 24.

Figure 13:
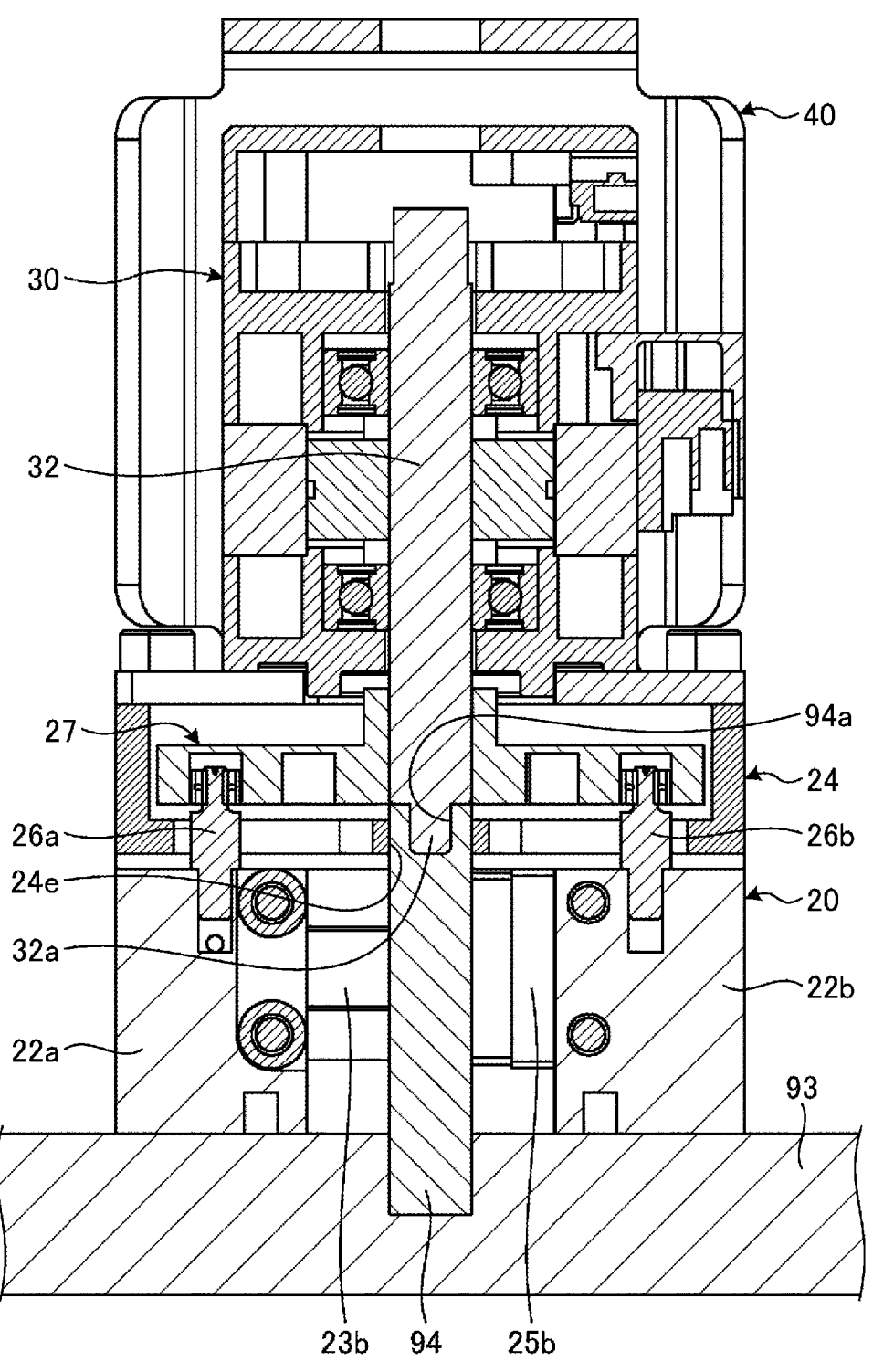
FIG. 13 is a longitudinal sectional view illustrating when the grasping part is fixed to the driving part and the fixing part.

FIG. 13 is a longitudinal sectional view when the grasping part 20 is fixed to the driving part 30 and the fixing part 40 and illustrates with the driving part 30 and the like disposed upside down with respect to FIG. 11 (with the cam 27 located on the lower side). In FIG. 13, a support rod 94 provided with a recess part 94a at the leading end is perpendicularly provided upright from a flat mounting base 93 of the assembling jig.

In this state, the rail holding part 24 where the rails 23a and 23b and the like are assembled is placed around the support rod 94 on the mounting base 93, with the claw holding parts 22a and 22b located on the mounting base 93 side. Then, the end of the support rod 94 is inserted with the outer peripheral surface of the leading end of the support rod 94 in contact with the inner peripheral surface of a circular hole 24e provided in the rail holding part 24. At this time, the circular hole 24e and the support rod 94 make contact with each other with a slight clearance (gap) that allows for detachment. The clearance at this time is 10 μm, for example.

Figure 14:
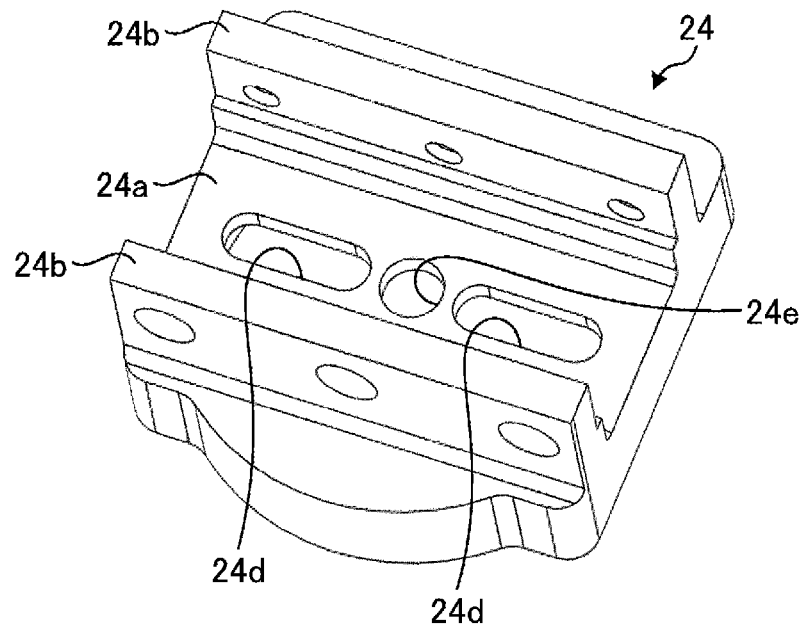
FIG. 14 is a perspective view (1) of a rail holding part.
Figure 15:
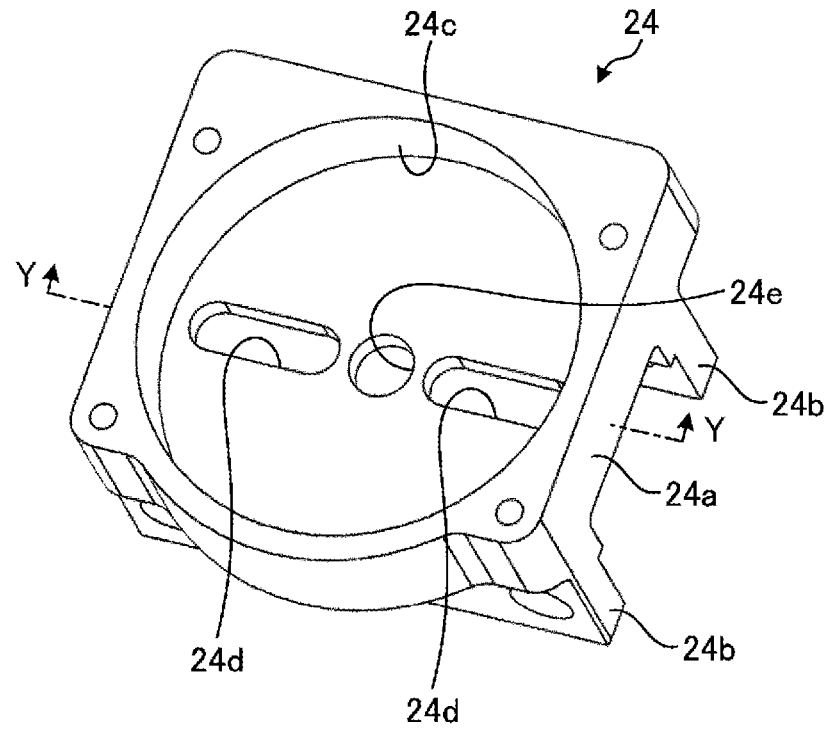
FIG. 15 is a perspective view (2) of the rail holding part.

FIG. 14 and FIG. 15 are perspective views of the rail holding part 24, FIG. 14 illustrates a state as viewed from the grasping part 20 side (a viewpoint close to FIG. 5), FIG. 15 illustrates a state as viewed from the driving part 30 side, and the Y-Y cross section in FIG. 15 corresponds to the portion of the rail holding part 24 of FIG. 13.

In FIG. 14 and FIG. 15, in the rail holding part 24, two wall parts 24b for fixing the rails 23a and 23b (FIG. 5 and the like) are formed at one surface of the base part 24a having a flat plate shape. A circular recess part 24c is provided at the rear surface of the base part 24a. Between the two wall parts 24b of the base part 24a, the circular hole 24e is provided at the center and two long holes 24d are provided to sandwich the circular hole 24e. The support rod 94 of the assembling jig is inserted to the circular hole 24e, as described above. Two long holes 24d provide a space where the two pins 26a and 26b slide.

Returning to FIG. 13, the circular hole 24e of the rail holding part 24 is inserted to the support rod 94 of the assembling jig, positioning, on the mounting base 93, the center of the rail holding part 24 where the rails 23a and 23b and the like are assembled. That is, the vertical direction is positioned by the leading ends (in the drawing, the lower ends) of the claw holding parts 22a and 22b making contact with the mounting base 93 and is positioned, in the plane of the mounting base 93, by the contact between the outer peripheral surface of the support rod 94 and the inner peripheral surface of the circular hole 24e of the rail holding part 24.

In this state, the fixing part 40 and the driving part 30 with the cam 27 press-fitted to the shaft 32 have the cam 27 side as the support rod 94 side, and the protruding part 32a at the leading end of the shaft 32 is engaged with the recess part 94a at the end of the support rod 94. The claw holding parts 22a and 22b coupled with the pins 26a and 26b are fixed to the slide movement parts 25a and 25b (FIG. 5), respectively, the slide movement parts 25a and 25b respectively mesh with the rails 23a and 23b (FIG. 5), and the rails 23a and 23b are fixed to the rail holding part 24. On the other hand, the cam 27 is fixed to the shaft 32 of the motor 31, and the positional relationship (coaxiality) between the rail holding part 24 and the shaft 32 is important for the positional relationship between the cam 27 and the pins 26a and 26b. In view of this, when the rail holding part 24 side and the driving part 30 side is assembled, the simple and accurate positioning can be performed by positioning the rail holding part 24 and the shaft 32 with reference to the common aligning assembling jig (the mounting base 93 and the support rod 94) and fixing the rail holding part 24 and the fixing part 40.

Embodiments of the present invention have been described above, but the present invention is not limited to the embodiments described above, and various modifications are possible without departing from the spirit of the present invention.

For example, while the two claw parts slide in the above-described embodiment, only one of the claw parts may slide to grasp workpieces together with the non-slidable claw part.

As described above, a grasping device according to the embodiment includes claw holding parts supported by rails in a slidable manner, a cam including grooves or curved holes having a spiral shape provided around a rotation center and a hole provided at the rotation center, pins each having one end engaged with the claw holding parts side and the other end engaged with the groove or the curved hole of the cam, a motor including a shaft to be fixed to the hole of the cam, and a rail holding part configured to hold the rails and engage a positioning jig with an end portion of the shaft at a side fixed to the cam and including a hole part with an inner peripheral surface where an outer peripheral surface of the jig is contactable. In this manner, a grasping device capable of performing proper contact between the groove of the cam and the pin through accurate positioning and preventing decrease in efficiency of the slide movement and wear of the cam.

In addition, the protruding part configured to engage with the recess part of the jig is provided at the leading end of the shaft exposed from the hole of the cam. This enables the positioning of the shaft to be reliably performed.

In addition, the fixing part for holding the motor is fixed with the rail holding part. This enables fixing with the rail holding part to be performed with the motor fixed with the fixing part.

Moreover, the present invention is not limited to the embodiment described above. A configuration obtained by appropriately combining the above-mentioned constituent elements is also included in the present invention. Further effects and modification examples can be easily derived by a person skilled in the art. Thus, a wide range of aspects of the present invention is not limited to the embodiment described above and may be modified variously.

REFERENCE SIGNS LIST

10 Grasping device
20 Grasping part
22a, 22b Claw holding part
23a, 23b Rail
24 Rail holding part
27 Cam
27a, 27b Groove
30 Driving part
31 Motor
32 Shaft
32a Protruding part
33 Motor case
40 Fixing part
93 Mounting base
94 Support rod
94a Recess part

The invention claimed is:

1. A grasping device, comprising:
claw holding parts supported by rails in a slidable manner;
a cam including grooves or curved holes having a spiral shape provided around a rotation center of the cam and a hole provided at the rotation center of the cam;
pins each having a first end engaged with a side of the claw holding parts and a second end engaged with the grooves or the curved holes of the cam;
a motor including a shaft to be fixed to the hole of the cam; and a rail holding part configured to hold the rails and engage a positioning jig with an end portion of the shaft at a side fixed to the cam and including a hole part with an inner peripheral surface where an outer peripheral surface of the jig is contactable, wherein a protruding part configured to engage with a recess part of the jig is provided at a leading end of the shaft exposed from the hole of the cam.

2. The grasping device according to claim 1, wherein a fixing part configured to hold the motor is fixed with the rail holding part.

\* \* \* \* \*